Jan. 12, 1937.    D. B. PERRY    2,067,243
DRIVE CHAIN
Filed Jan. 17, 1935    2 Sheets-Sheet 1
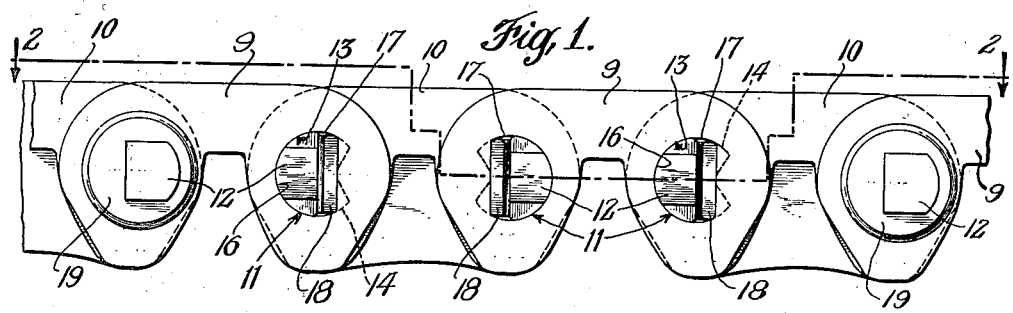
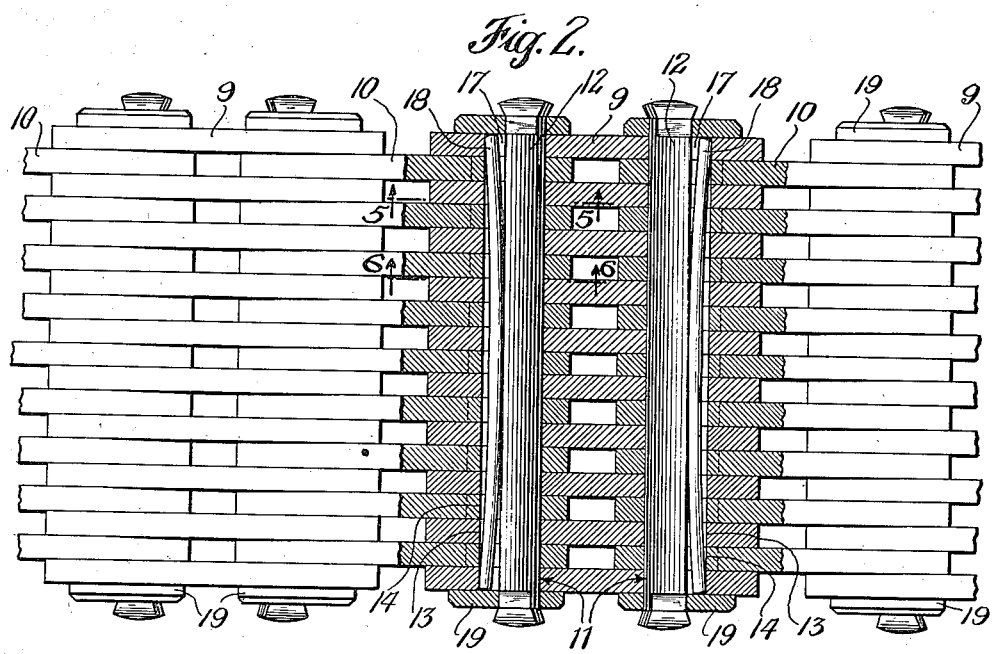
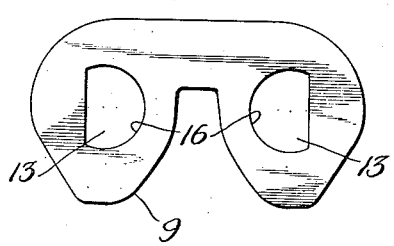
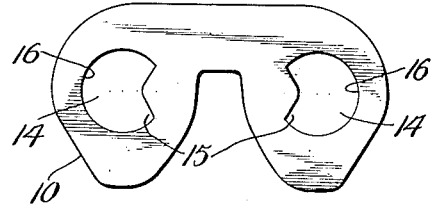
INVENTOR
David Barnes Perry
BY
Synnestvedt & Lechner
ATTORNEYS Jan. 12, 1937.  D. B. PERRY  2,067,243
DRIVE CHAIN
Filed Jan. 17, 1935  2 Sheets-Sheet 2

INVENTOR
David Barnes Perry
BY
Synnestvedt + Lechner
ATTORNEYS

Patented Jan. 12, 1937

2,067,243

UNITED STATES PATENT OFFICE 2,067,243

DRIVE CHAIN

David Barnes Perry, Ithaca, N. Y., assignor to Morse Chain Company, Ithaca, N. Y., a corporation of New York Application January 17, 1935, Serial No. 2,151

5 Claims. (Cl. 74—251)

This invention relates to drive chains and has for its primary object the provision of an improvement in joint constructions for such chains of a character that a certain degree of elasticity is definitely obtained in the chain.

Another object of my invention is the provision of an elastic joint construction for drive chains calculated to normally shorten the pitch of the chain within limits.

It is also an object of my invention to provide an improved joint construction for drive chains operating to absorb or take up in the slack run of the chain accumulation resulting from elongation of pitch under load.

Another object of my invention resides in the provision of resilient means in the joints of drive chains, said resilient means being constructed and arranged as an adjunct to pintle means of the joints whereby elasticity is provided in the chain.

A more specific object of my invention resides in associating spring means with the pintle means of drive chain joints in a novel manner.

Among the advantages to be obtained through the practice of my invention is the elimination of whipping and vibration difficulties.

How the foregoing together with such other objects and advantages as may hereinafter appear or are incident to my invention are realized is illustrated in preferred form in the accompanying drawings, wherein Figure 1 is a side elevation of a portion of a drive chain constructed in accordance with my invention in which certain end washers are removed to show the joint construction;

Figure 2 is a section taken on the line 2—2 of Figure 1;

Figures 3 and 4 are detailed views of links employed in the chain;

Figure 5:
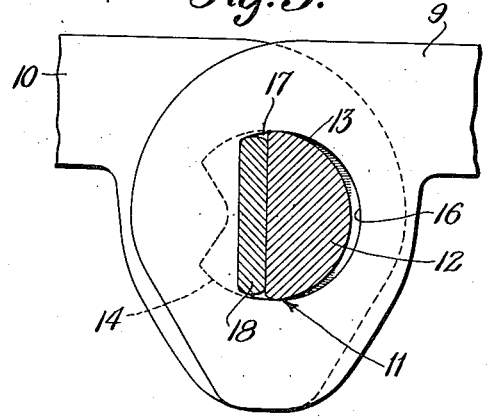
Figure 5 is an enlarged fragmentary sectional elevation taken on the line 5—5 of Figure 2 with the chain under load.
Figure 6:
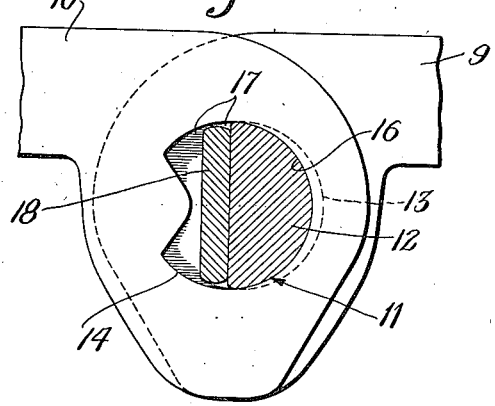
Figure 6 is a view similar to Figure 5 taken on the line 6—6 of Figure 2.
Figure 7:
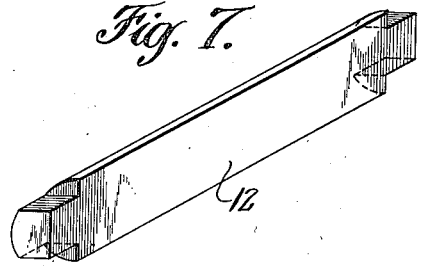
Figure 7 is an isometric view of the pintle part.
Figure 8:
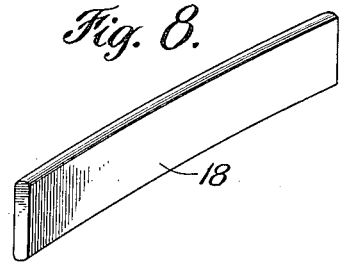
Figure 8 is an isometric view of a spring member which I associate with the pintle part.

The drive chain illustrated comprises the links 9 and 10 each composed of a plurality of arch shaped plates having tooth portions for engaging the teeth of sprocket wheels, and joints indicated by the reference numeral 11.

The joints comprise, in their simplest form, a single pintle part or pin 12 approximately half round or semi-circular in cross section received in the apertures 13 and 14 of the links, it being noted that the apertures 13 in the plates of the links 9 are of substantially semi-circular form similar to the pintles as shown in Figure 3, and that the apertures 14 in the plates of the links 10 have clearance portions 15 as shown in Figure 4 which permits of bending of the chain in passing over the sprockets.

The curved surfaces 16 of the link apertures correspond to the curvature of the pintles but the distance across the apertures is greater than the width of the pintles in cross section so that spaces are provided at 17. In these spaces I locate yieldable members 18, in this instance in the form of curved members of spring metal. The size of the spaces 17 is such relative to the thickness of the spring members that a certain degree of the spring action is obtained.

In assembling the chain the plates of the links 9 are interspersed with the plates of the links 10 as shown in Figure 2 and the pintles 12 and spring members 18 are inserted in the apertures. The end portions of the pintles are shouldered and washers 19 fitting the shouldered portions are riveted in place so that the parts are held in assembled relation with the spring members 18 extending between end washers. The pintles are keyed, so to speak, in the links 9 so that they turn therewith as the chain bends with the curved surfaces of the pintles turning in the curved surfaces of the adjacent connected links.

In the assembled chain the total bend in the spring members is reduced to the clearance in the apertures and the action in the joints, by reason of the spring members, is that of decreasing or shortening the pitch of the chain within limits as predetermined by the clearance in the joints. Thus the limit of elasticity of the chain is controlled by the size of the apertures and the degree of elasticity is controlled by the curvature or camber and thickness of the spring members. In other words the thickness and initial bend of the spring members are so calculated as to supply or create the necessary force to shorten the pitch and the amount of clearance in the apertures makes it possible to limit the shortening of the pitch so that the chain may still function properly on the sprockets.

The spring members are supplementary to and independent of the pintles as far as pintle bearing and working action are concerned for they are adjuncts to the pintles operating to provide elasticity in the chain and are not actual working parts of the pintles. Stated in another way these spring members constitute means associated with the pintle means of the chain to tension the joints in a manner to shorten the pitch of the chain.

As pointed out above the pintle parts turn with one set of links and have turning movement in the other set of links and therefore the interpretation of spring members at the flat or non-bearing side of the pintles does not have the effect of cutting down bearing surface in the joints even though these members are cambered, as is the case in chains in which the pintles themselves become curved or cambered as an incident to chain manufacture, for example, as may result from the hardening of the pintle parts.

I obtain the desired elasticity in the chain through the employment of means which is an adjunct to the pintle and therefore do not sacrifice any desirable pintle action by a reduction of bearing areas or surfaces.

In a chain drive employing a chain constructed in accordance with my invention any elongation of pitch in the load or driving run or side of the chain is compensated for in the slack run or side of the chain by virtue of the shortening of the pitch in the slack run effected by the spring action or tensioning of the joints. Thus elongation due to wear is effectively compensated for and since the slack run is in tension the effect of the synchronizing force which tends to cause objectionable whip in the chain is nullified.

My invention is very advantageous in installations where it is difficult to adjust shaft center distances to compensate for elongation in the chain due to wear, because, if the center distances are not adjusted the chain falls away from the lower sprocket, thus making it assume a very unnatural position on the sprocket. This is particularly objectionable where the lower sprocket has a small number of teeth because the load on the pulling side would elongate the pitch and transfer the accumulation to the other side and soon result in the chain falling away from the sprocket. Through the practice of my invention the spring action in the joints exerting, as it does, force in the direction of shortening the pitch, absorbs the accumulation in pitch and keeps the slack side in proper running relation with the lower sprocket.

While I have illustrated a chain employing a particular form of single part pintle it is to be understood that the advantages of my invention may be realized in chains employing other forms of single part pintles as well as where multi-part pintle parts are employed.

I also contemplate employing multiple springs or double bent or cambered springs instead of the single cambered springs illustrated.

I claim:—

1. A drive chain comprising, in combination, a series of links, friction joints for pairs of said links comprising a substantially semi-circular pin having a keying surface and convex bearing surface, and a yieldable member located between the keying surface of said pin and the links for tensioning the joints.

2. A drive chain comprising, in combination, a series of links, a substantially semi-circular pin joining pairs of said links, said pin having a convex bearing surface and a keying surface and a yieldable member located between said keying surface of said pin and the links for tensioning the joints.

3. In a drive chain, the combination of links having pintle receiving apertures, substantially semi-circular non-yieldable pintle members in said apertures pivotally joining the links, and bowed spring members located in said apertures between the pintle members and the links for tensioning the joints, said spring members being mounted in the apertures of one set of links to rotate therewith and having clearance in the apertures of the connected set of links when the chain is under load and said substantially semi-circular pintle members have convex bearing surfaces on which the links have frictional turning movement.

4. In a drive chain, the combination of links having apertures therein, and a joint for pairs of said links comprising a substantially semi-circular pin having a keying surface for keying it in an aperture of one link to rotate therewith and a convex bearing surface providing frictional turning movement in the associated aperture of the connected link, a bowed spring member in said apertures and located between the keying surface of the pin and adjacent wall surfaces of the apertures, said spring member being keyed in the link in which the pin is keyed and being rotatable in the connected link.

5. A yielding joint for chains comprising links, substantially semi-circular pintle means having convex bearing surfaces, apertures in adjacent links for receiving the pintle means having concave bearing surfaces engaging the convex bearing surfaces of the pintle pins and having keying surfaces spaced from the pintle means, and bowed spring means in said spaces engaging the pintle means and said spaced keying surfaces of the apertures.

DAVID B. PERRY.